United States Patent
Gebhart et al.

(10) Patent No.: US 8,405,337 B2
(45) Date of Patent: Mar. 26, 2013

(54) METHOD OF CONTROLLING AN AUTOMATIC DOOR SYSTEM

(75) Inventors: Steven A. Gebhart, Tipp City, OH (US); Syed A. Hossain, Springboro, OH (US)

(73) Assignee: Globe Motors, Inc., Dayton, OH (US)

( * ) Notice: Subject to any disclaimer, the term of this patent is extended or adjusted under 35 U.S.C. 154(b) by 427 days.

(21) Appl. No.: 12/616,334

(22) Filed: Nov. 11, 2009

(65) Prior Publication Data

US 2010/0115853 A1    May 13, 2010

Related U.S. Application Data

(60) Provisional application No. 61/113,720, filed on Nov. 12, 2008.

(51) Int. Cl.
*H02P 1/00* (2006.01)
*G05B 17/00* (2006.01)
*E05F 15/08* (2006.01)
*E06B 3/00* (2006.01)

(52) U.S. Cl. .......... 318/445; 318/400.01; 318/452; 318/689; 49/349; 49/506

(58) Field of Classification Search .......... 318/400.01, 318/452, 689; 49/349, 506
See application file for complete search history.

(56) References Cited

U.S. PATENT DOCUMENTS

| | | | |
|---|---|---|---|
| 3,039,764 A | 6/1962 | Heinsman et al. | |
| 4,727,679 A | 3/1988 | Kornbrekke et al. | |
| 5,040,331 A * | 8/1991 | Merendino et al. | 49/25 |
| 5,072,973 A | 12/1991 | Gudgel et al. | |
| 5,250,765 A * | 10/1993 | Mizuno et al. | 187/103 |
| 5,289,162 A * | 2/1994 | McDaniel | 340/521 |
| 5,770,934 A | 6/1998 | Theile | |
| 5,878,530 A | 3/1999 | Eccleston et al. | |
| 5,913,763 A | 6/1999 | Beran et al. | |
| 6,034,494 A | 3/2000 | Kitamine et al. | |
| 6,049,287 A * | 4/2000 | Yulkowski | 340/693.12 |
| 6,223,469 B1 | 5/2001 | Moll | |
| 6,259,352 B1 | 7/2001 | Yulkowski et al. | |
| 6,316,892 B1 | 11/2001 | Valencia | |
| 6,338,693 B1 | 1/2002 | Scholten et al. | |
| 6,553,717 B2 | 4/2003 | St. John et al. | |
| 6,588,153 B1 | 7/2003 | Kowalczyk | |
| 6,705,047 B2 | 3/2004 | Yulkowski | |
| 6,751,909 B2 | 6/2004 | Ranaudo | |
| 6,891,479 B1 | 5/2005 | Eccleston | |
| 7,145,436 B2 | 12/2006 | Ichikawa et al. | |
| 7,316,096 B2 | 1/2008 | Houser et al. | |
| 2002/0104266 A1 * | 8/2002 | Ranaudo | 49/334 |
| 2003/0213177 A1 | 11/2003 | Fitzgibbon et al. | |
| 2006/0197481 A1 * | 9/2006 | Hotto et al. | 318/280 |
| 2006/0244271 A1 | 11/2006 | Hass | |
| 2006/0293821 A1 * | 12/2006 | Takahashi | 701/49 |
| 2007/0108927 A1 * | 5/2007 | Valencia et al. | 318/282 |
| 2010/0242368 A1 * | 9/2010 | Yulkowski | 49/349 |

* cited by examiner

*Primary Examiner* — Walter Benson
*Assistant Examiner* — Gabriel Agared
(74) *Attorney, Agent, or Firm* — Stevens & Showalter LLP

(57) ABSTRACT

A door position control including an electric door actuator having a motor and a motor controller in communication with a system controller. A motor actuation operation is selected from a plurality of predetermined motor actuation operations to provide control signals to the motor controller for controlling actuation of the motor for control of door movement. Control of door movement is effected with reference to parameters specific to an installation location including an angular sweep of the door between open and closed positions and with reference to an available bus voltage for supplying power to the motor.

19 Claims, 8 Drawing Sheets

| State | Door Position | Speed Command | Current Command |
|---|---|---|---|
| Opening | Door position is in between CLOSED_POSITION and Back Check Position | $\omega_{set}$ | $I_{max}$ |
| | Door position is in soft stop range between Back Check position and 20% from Back Check Position | Reduce speed command linearly from $\omega_{set}$ to $0.9 \times \omega_{set}$ | $I_{max}$ |
| | Door position is in soft stop range between 20% from Back Check Position and 80% from Back Check Position | Reduce speed command linearly from $0.9 \times \omega_{set}$ to $0.1 \times \omega_{set}$ | $I_{max}$ |
| | Door position is between 80% from Back Check Position and (OPEN_POSITION - X1deg) | Reduce speed command linearly from $0.1 \times \omega_{set}$ to 0 | $I_{max}$ |
| | Door position is within 1 degree of the OPEN_POSITION | 0 | 0.1A for 200ms, and then "holding" |
| | Door Position > (OPEN_POSITION + X1deg) | $0.2 \times \omega_{set}$ | Dynamic brake with 80% duty |
| Holding | (OPEN/CLOSED_POSITION - X1deg) < Door Position < (OPEN/CLOSED_POSITION + X1deg) | Dynamic brake with 80% duty | $-I_{max}$ |
| Closing | Door position is in between OPEN_POSITION and Lock Check Position | $\omega_{set}$ | $-I_{max}$ |
| | Door position is in soft stop range between Lock Check Position and 20% from Lock Check Position | Reduce speed command linearly from $\omega_{set}$ to $0.9 \times \omega_{set}$ | $-I_{max}$ |
| | Door Position is between 20% from Lock Check Position and 80% from Lock Check Position | Reduce speed command linearly from $0.9 \times \omega_{set}$ to $0.1 \times \omega_{set}$ | $-I_{max}$ |
| | Door position is between 80% from Lock Check Position and (CLOSED_POSITION + X1deg) | Reduce speed command linearly from $0.1 \times \omega_{set}$ to 0 | $-I_{max}$ |
| | Door position within 1 degree of the CLOSED_POSITION | 0 | -0.1A for 200ms, and then "holding" |
| | Door Position within < (CLOSED_POSITION - X1deg) | $0.2 \times \omega_{set}$ | $I_{max}$ |

FIG. 8

METHOD OF CONTROLLING AN AUTOMATIC DOOR SYSTEM

CROSS-REFERENCE TO RELATED APPLICATION

This application claims the benefit of U.S. Provisional Application Ser. No. 61/113,720, entitled DOOR POSITION CONTROL, filed Nov. 12, 2008, the entire disclosure of which is incorporated by reference herein.

FIELD OF THE INVENTION

The present invention relates to power door assemblies and, more particularly, to a power door assembly including a control system for implementing door actuation commands to move a door.

BACKGROUND OF THE INVENTION

It is known to provide a door with a door operator to open and/or close the door relative to a door opening. Such door operators may incorporate a motor, such as an electric motor and a drive/actuation mechanism to convert the movement of a motor rotor into movement of the door, such as swinging movement, to open or close the door. Electric motors are commonly used in door operators, and frequently require substantial operating currents and/or voltages to provide the necessary power for controlling movement of the door. In addition, in the case of commutator motors, the motor must be of substantial size in order to provide the desired torque, such that the door operator may form a bulky unit that is not easily installed onto existing door structures.

Typical applications of door operators include buildings that require automatic actuation of doors in the event of an emergency, such as may be required for a fire door. Other common applications of door operators include door openings designed for access by individuals with disabilities, such as persons in wheelchairs. In such applications, it is also desirable to control of the motor to provide a desired movement profile and to respond to external inputs to the door. Such inputs requiring a response may comprise a manual push or pull on the door, in which it is desirable to permit door movement without substantial resistance. It is further desirable to enable the control to detect an obstruction to the door and respond in such a way as to preferably maintain an existing door movement command while also responding to the obstruction without applying excessive force against the obstruction.

Other characteristics of a door operator are also desirable to provide efficient controlled movement of the door in combination with a compact door actuator that may be readily incorporated in a range of door configurations.

SUMMARY OF THE INVENTION

In accordance with one aspect of the invention, a method is provided for controlling an electric motor of an automatic door system. The motor is operatively connected to a door panel to enable the motor to perform a door moving operation for moving the door relative to a door frame. The motor is operable to move the door between open and closed positions using electric power signals delivered to the motor from an electric power supply. The electric power signals being controlled through a motor controller in communication with a system controller, and the system controller is operable to provide control signals to the motor controller for switching power source connections from the power supply to windings of the motor to define motor actuation operations. The method comprises: at the system controller selecting a motor actuation operation from a plurality of predetermined motor actuation operations, and providing control signals to the motor controller corresponding to the selected motor actuation operation; effecting control of movement of the door using the selected motor actuation operation whereby the angular position of the door relative to the door frame is controlled by switching the power source connections in response to the control signals received from the system controller; and wherein the motor actuation operation comprises switching the power source connections to maintain the door at a substantially stationary position relative to the door frame including providing a resistance to an external force applied on the door in a door opening direction without providing a motive electrical power to the motor.

In accordance with another aspect of the invention, a method is provided for controlling an electric motor of an automatic door system. The motor is operatively connected to a door panel to enable the motor to perform a door moving operation for moving the door relative to a door frame. The motor is operable to move the door between open and closed positions using electric power signals delivered to the motor from an electric power supply. The electric power signals being controlled through a motor controller in communication with a system controller, and the system controller is operable to provide control signals to the motor controller for switching power source connections from the power supply to windings of the motor to define motor actuation operations. The method comprises: providing a set point input, the set point input defined as an operator selected parameter provided as an input to the system controller and corresponding to at least one of a door opening time and a door closing time; converting the set point input to a speed set value comprising a maximum speed for the motor to move the door; providing a speed command value proportional to the speed set value, and using the speed command value to provide a variable voltage command value; providing a first duty cycle value equal to a ratio of the variable voltage command value and a bus voltage value, the bus voltage value corresponding to a voltage provided from the power supply; and providing control signals from the system controller to the motor controller corresponding to the first duty cycle value, the control signals determined with reference to the first duty cycle value, and switching the power source connections in response to the control signals received from the system controller to effect movement of the door at a speed corresponding to the speed command value.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 8 is a Position Command table illustrating relationships between the state of the control system, an actual door position, and speed and current commands provided to a duty cycle controller;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
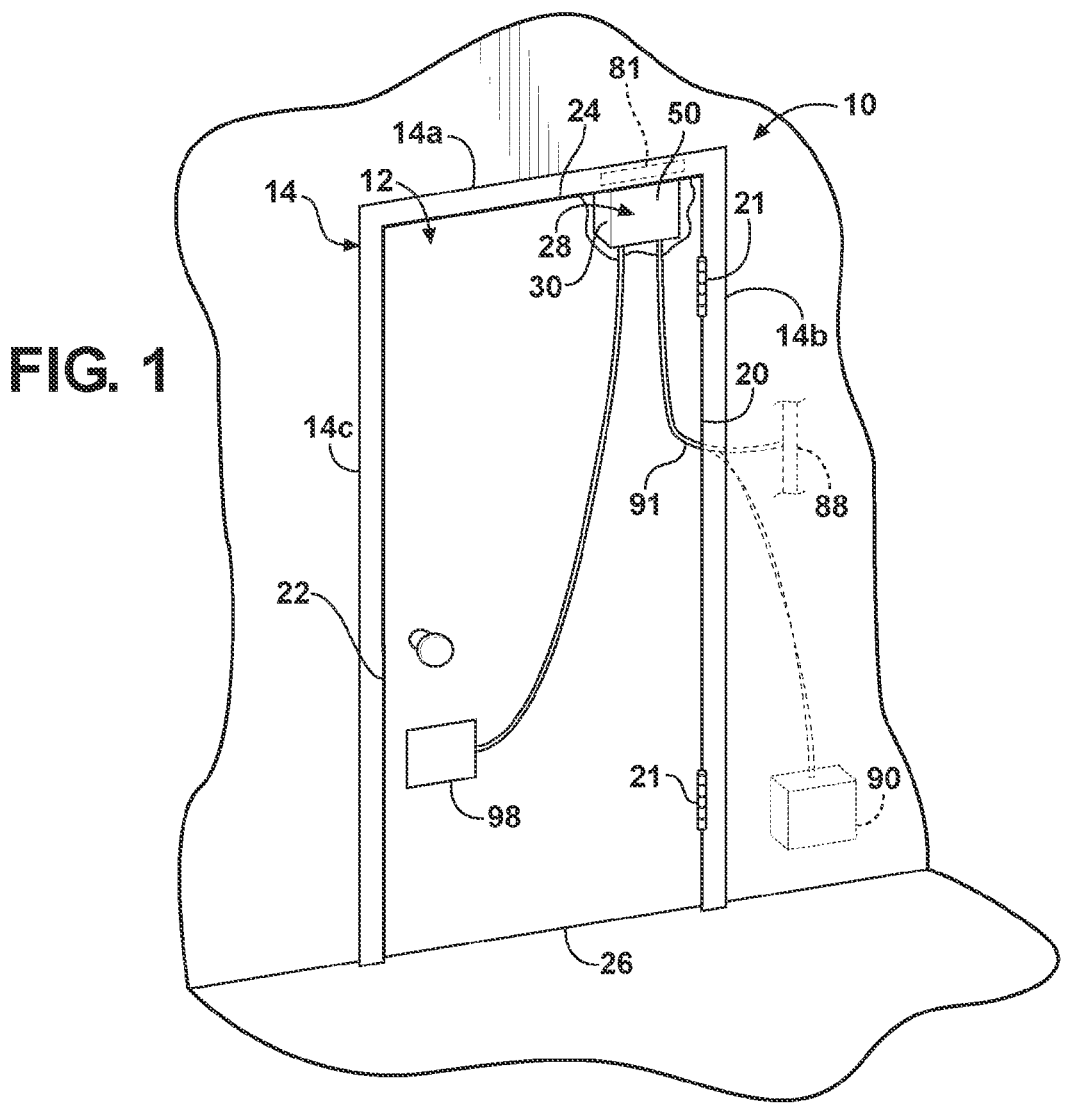
FIG. 1 is an electric door actuation system in accordance with the present invention.

Referring to FIG. 1, an electric door actuation system 10 is shown for use in controlling movement of a door 12 supported for pivotal movement between open and closed positions in a doorway defined by a door jamb or frame member 14 having a horizontal header 14a and vertical jambs 14b, 14c. The door 12 includes substantially parallel, planar first and second panels 16, 18 (see FIG. 2), opposing inner and outer vertical edge surfaces 20, 22 connecting vertical edges of the first and second panels 16, 18, and opposing upper and lower horizontal edge surfaces 24, 26 connecting horizontal edges of the first and second panels 16, 18. Either of the vertical edge surfaces 20, 22 may be supported by hinges 21 to the frame member 14.

An electric actuator 28 is provided for controlling and effecting movement of the door 12 relative to the frame member 14. The electric actuator may be located adjacent to either of the vertical edge surfaces 20, 22, depending on the location of the hinges 21, and is shown in the illustrated embodiment as being located within a pocket 30 formed between the first and second panels 16, 18 adjacent the inner vertical edge surface 20 of the door 12. The electric actuator 28 is illustrated as being connected to the horizontal header 14a by an actuator arm 32 for effecting pivoting movement of the door 12 relative to the frame member 14, as will be described further below.

Figure 3:
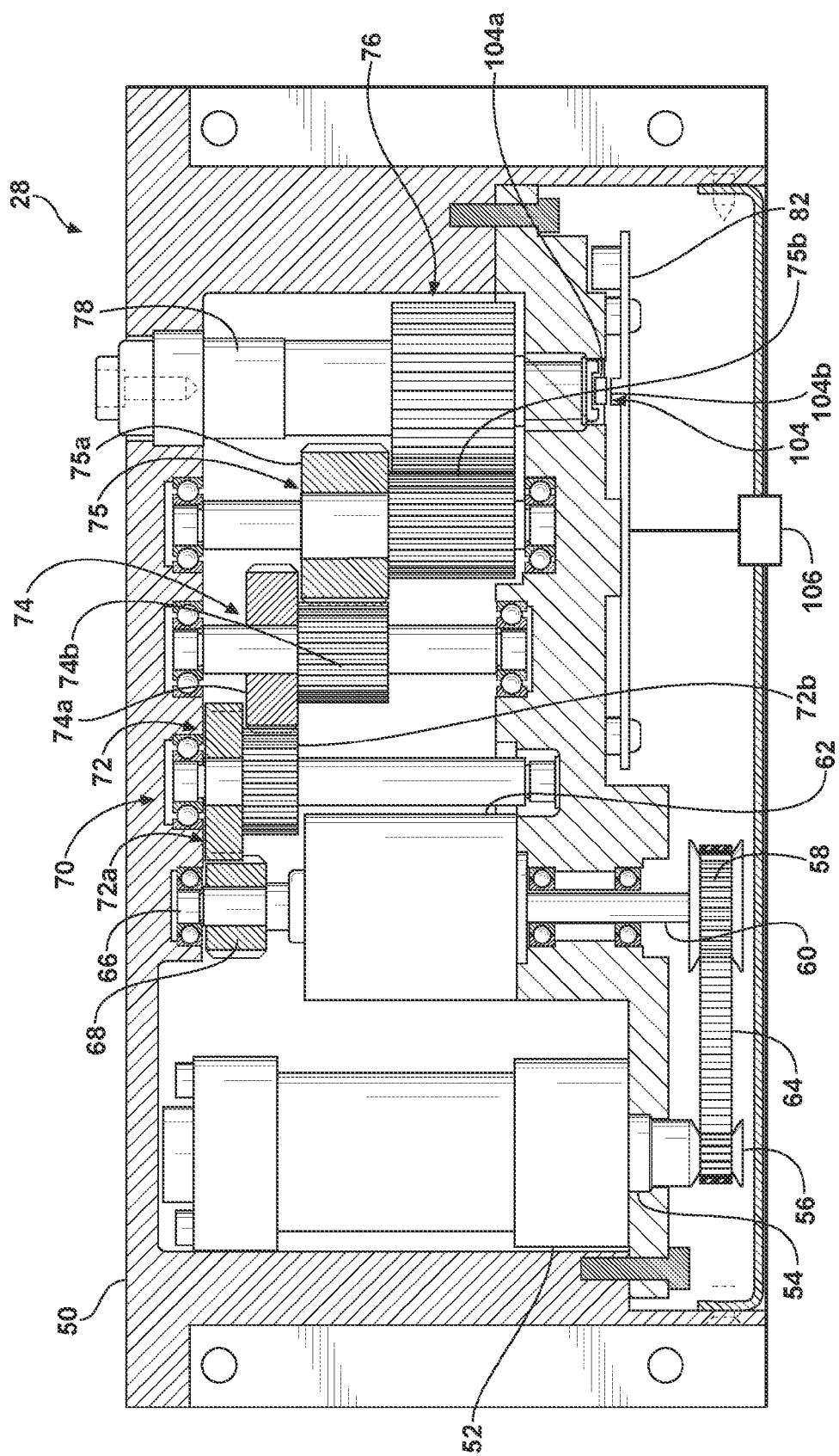
FIG. 3 is cut-away view of the electric door actuator and illustrating components located within the actuator.

Referring to FIG. 3, the electric actuator 28 comprises a housing 50 and an electric motor 52 located within the housing 50. The motor 52 preferably comprises a 24 VDC brushless DC motor. The motor includes an output shaft 54 driving a toothed output pulley 56. The toothed output pulley 56 is coupled to a toothed input pulley 58 on an input shaft 60 of a planetary gear box 62 via a toothed belt 64. A reduction drive is provided by the output pulley 56, the input pulley 58 and the belt 64, and the planetary gear box 62 comprises a reduction gear box for providing an increase in torque at an output shaft 66 of the gear box 62.

A drive pinion gear 68 on the output shaft 66 of the gear box 62 drives a spur gear train 70 including first, second and third compound spur gears 72, 74 and 75, respectively, and a driven spur gear 76. The first compound spur gear 72 includes a large spur gear 72a meshingly engaged with the drive pinion gear 68 and a small spur gear 72b attached for rotation with the large spur gear 72a. The second compound spur gear 74 includes a large spur gear 74a and a small spur gear 74b, where the large spur gear 74a is attached for rotation with the small spur gear 74b. The large spur gear 74a of the second compound spur gear 74 is meshingly engaged with the small spur gear 72b of the first compound spur gear 72. The third compound spur gear 75 includes a large spur gear 75a and a small spur gear 75b, where the large spur gear 75a is attached for rotation with the small spur gear 75b. The large spur gear 75a of the third compound spur gear 75 is meshingly engaged with the small spur gear 74b of the second compound spur gear 74, and the small spur gear 75b of the third compound gear 75 is meshingly engaged with the driven spur gear 76. The gear drive train 70 provides a gear reduction from the drive pinion gear 68 to the driven spur gear 76.

Figure 2:
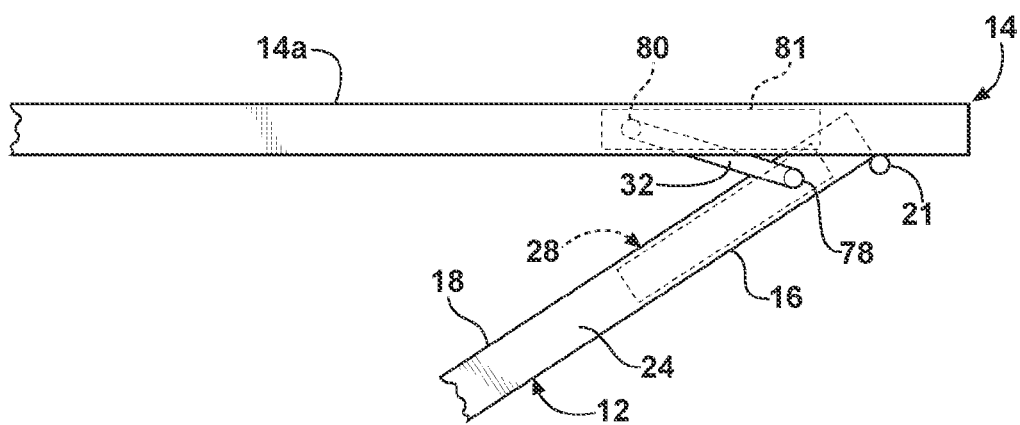
FIG. 2 is a top plan view illustrating an electric door actuator incorporated in a door and illustrating an exemplary actuation mechanism between the door and a door frame.

An output shaft 78 is rigidly affixed to the driven spur gear 76. The output shaft 78 provides a drive torque for directly driving the actuator arm 32 in response to the drive force from the motor 52 (see FIG. 2). As seen in FIG. 2, an end of the actuator arm 32 distal from the output shaft 78 includes a roller 80 located within a slot 81 formed in the horizontal header 14a. The roller 80 slides along the slot 81 as the actuator arm 32 rotates with the output shaft 78, to provide an actuating force relative to the frame member 14 for effecting movement of the door 12 toward either the open or closed positions. The mechanism providing a connection between the electric actuator 28 and the frame member 14 may be similar to that described in U.S. Pat. No. 6,588,153, which patent is incorporated herein by reference. It should be noted that other mechanisms may be provided for producing a force to pivot the door 12 relative to the frame member 14, including structure utilizing a compound or articulated arm. Alternatively, the electric actuator 28 may be mounted to the horizontal header 14a or on either of the first and second panels 16, 18, and may be located for pivoting at either of the vertical edge surfaces 20, 22, as well as located for push or pull movement. The full range of movement of the door 12 to the open and closed positions may be effected by actuation of the motor 52 without the aid of additional actuators, such as spring or other stored mechanical energy actuators.

As noted above, the electric actuator 28 may be mounted adjacent to either vertical edge surface 20, 22 of the door 12. The electric actuator 28 may be controlled with reference to the location of the actuator 28 on the door 12 and to provide an opening and closing force as determined by the location of the actuator and pivoting direction of the door 12 relative to the frame member 14.

Figure 4:
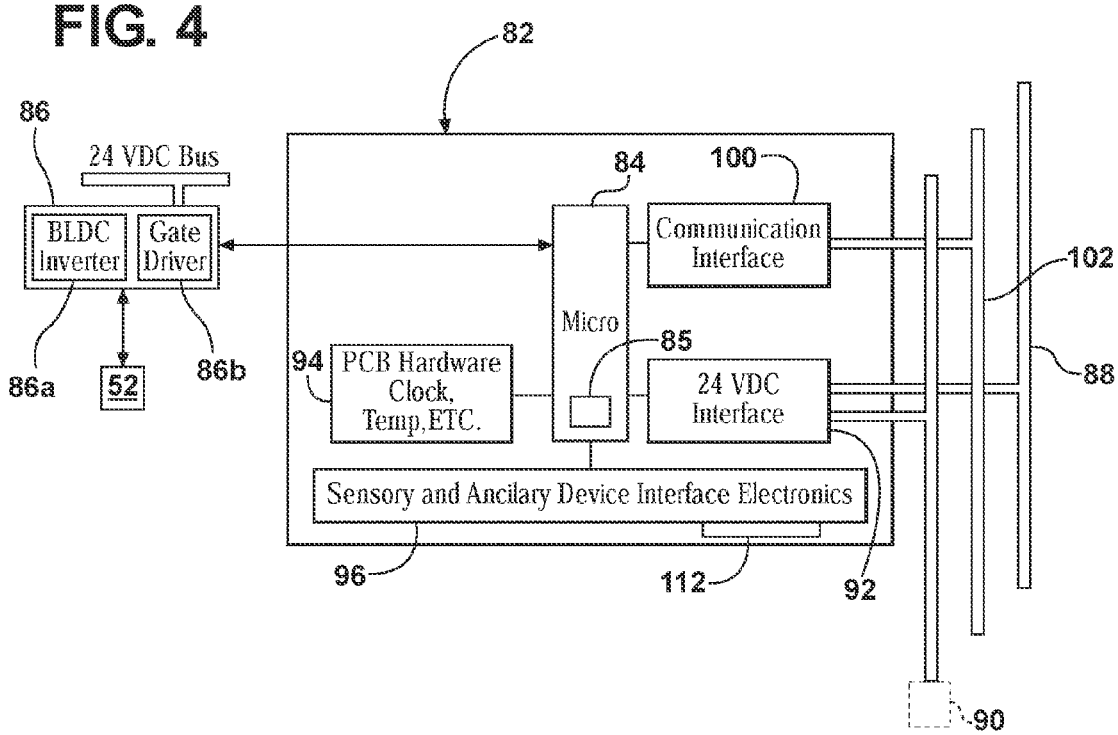
FIG. 4 diagrammatically illustrates components of a control unit incorporated in the electric door actuator.

Referring to FIG. 3, the electric actuator 28 further comprises a control unit 82 defined on a printed circuit board mounted within the housing 50. As seen in FIG. 4, the control unit 82 includes a system controller 84 comprising a microprocessor including a memory and, in particular, the system controller 84 comprises a non-volatile memory 85 for storing data including door position settings, as will be described further below.

The control unit 82 communicates with a motor controller 86 comprising a brushless DC (BLDC) inverter 86a and a gate driver 86b operating under control of the system controller 84 to drive the motor 52 for effecting movement of the door 12 at predetermined opening and closing speeds and to predetermined positions. The motor controller 86 is connected to a 24

VDC bus. The gate driver 86b provides appropriate voltage/current signals to the inverter 86a to operate power control switches, e.g., FETs/transistors, in the inverter 86a.

Figure 5:
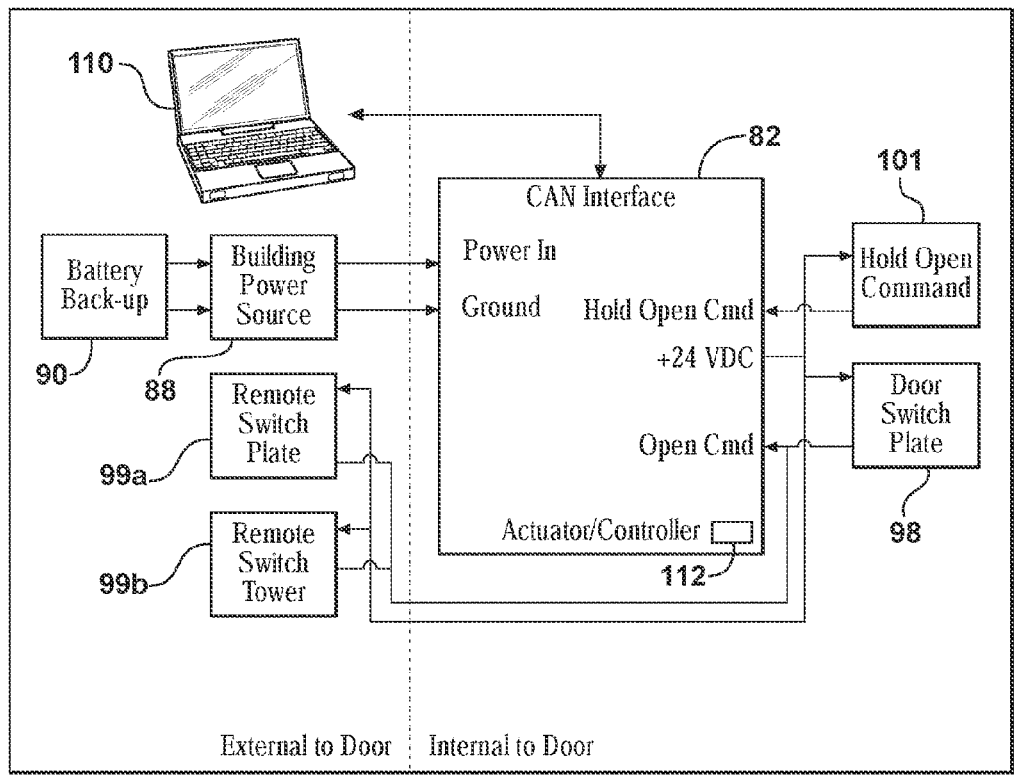
FIG. 5 diagrammatically illustrates a door system incorporating the electric door actuator.

The control unit 82 is provided with power from an electrical power supply comprising a 24 VDC interface 92 receiving power from either a standard 24 VDC building power system 88 or from a battery or battery backup system 90. The 24 VDC interface provides a low voltage power supply, i.e., less than 24 V, to the system controller 84. A power cable 91 may convey the power to the 24 VDC interface 92 from the building power system 88 and/or the battery system 90, as is illustrated in FIG. 1. It should be noted that although the battery system 90 is illustrated at a location outside of the door 12, the battery system 90 may alternatively be provided within the door 12. The 24 VDC interface 92 may provide power to the system controller 84 and any other devices that are operated under control of the control unit 82. For example, the control unit 82 may include a clock, a temperature sensor or other hardware 94 formed on the printed circuit board defining the control unit 82, as well as interface electronics 96 for communicating with and/or driving ancillary devices and/or sensors. It should be understood that the interface electronics 96 may be in communication with various types of devices that are in, on or in proximity to the door 12, including position sensors, magnetic catches, locks, switches, mats or other sensing devices (not shown). In particular, the interface electronics 96 may be in communication with a door mounted switch plate 98 (FIG. 1), a remote switch plate 99a (FIG. 5) or a remote switch tower 99b (FIG. 5) for initiating a door opening or closing operation. In addition, the interface electronics 96 may be in communication with a hold open command switch 101 (FIG. 5) for maintaining the door 12 in an open position.

Also, in the preferred embodiment, a position sensor 104 (see FIG. 3), including a movable member 104a affixed to the shaft 78 and a stationary member 104b mounted on the control unit 82, comprises an absolute magnetic encoder, and is provided for sensing an angle of the output shaft 78 within 360 degrees, defined as an actual position, $\theta_{act}$, of the door 12. The position sensor 104 may comprise any commercially available position sensor capable of providing a high degree of angular resolution with pivotal movement of the door 12. The position sensor 104 preferably comprises a programmable magnetic rotary encoder providing an absolute angular position output, such as, for example, a system-on-chip device providing a high resolution digital output in response to absolute angular positions, e.g., a 10 bit resolution device to provide 1024 absolute positions for 360° of rotational movement. Other position sensors, comparable to the described position sensor 104, may be utilized to provide an output position sensing signal.

The control unit 82 further includes a communication interface 100 through which the system controller 84 may communicate with a smart building communication system and/or a device programming network via a communication conduit 102 (FIG. 4). The communication interface 100 may also provide communication with other door systems, i.e., smart doors, within the building.

To facilitate connection of the electric actuator 28 to the door 12 and associated power and communication lines, the connection from the control unit 82 to a wiring harness including the power cable 91, communication conduit 102 and sensor or ancillary devices is preferably provided by a connector 106 located on the housing 50, as seen in FIG. 3. The connector 106 facilitates installation of the electric actuator 28 as a modular unit that may be easily installed or retrofit to existing door installations. Alternatively, the electrical connections to the electric actuator 28 may be formed by other means such as, for example, by a plurality of connectors (not shown) replacing the connector 106, by direct connection of wires of a flying lead harness to the control unit 82, i.e., wires (not shown) soldered directly to the printed circuit board for the control unit 82, or by connection of the wires at a screw terminal barrier strip (not shown).

The device programming network via the communication conduit 102 may comprise a controller area network (CAN). Alternatively, other communication networks may be implemented such as, for example, RS-232, RS-485, SPI, 10/100 Ethernet, 802.11 Ethernet, LonWorks, BACnet, ZigBee, or other network systems. The control unit 82 may be programmed or otherwise controlled over the CAN or other communication network, and may be programmed, such as via a computer 110 (FIG. 5), to provide the door movement with specific open and close motion profiles, i.e., opening and closing velocities and positions, and to provide a specified hold open time. Such programmable movement of the door 12 may include holding the door 12 in any predetermined position for short periods of time, and/or including a delayed-hold-to-close after opening. The control unit 82 is also preferably capable of operating in cooperation with signals from the position sensor 104 in a learning mode for determining open and closed positions for the door 12 and saving these positions in the non-volatile memory 85 of the system controller 84, as is described further below. By using an absolute encoder as the position sensor 104 and storing the door open and closed positions in non-volatile memory 85, the position of the door 12 may be determined at any time, even after a total power loss condition, thereby eliminating the need to retrain, reprogram or cycle the door to restore the position information.

It should also be noted that some functions such as, for example, the open and/or close time and the force sensitivity may also be set directly at the electric actuator 28 by accessing one or more potentiometers (depicted generally at 112 in FIGS. 4 and 5) on the circuit board of the control unit 82 through holes (not shown) provided through the housing 50 (FIG. 1).

As discussed briefly above, the described electric actuator 28 performs a door moving operation in which the motor 52 is controlled to move the door 12 between open and closed positions using an electrical power signal delivered to the motor 52 from the motor controller 86 in communication with the system controller 84. The system controller 84 is operable to provide control signals to the gate driver 86b for switching power source connections at the inverter 86a to control the power supply to windings of the motor 52 to define motor actuation operations.

Figure 6:
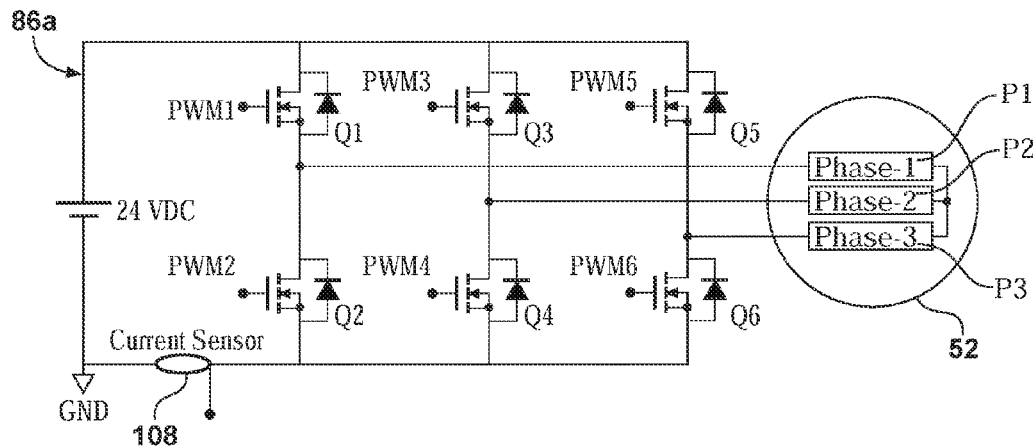
FIG. 6 is a schematic diagram of an inverter circuit for controlling a brushless DC motor in the electric door actuator.

The BLDC inverter 86a for the motor controller 86 is illustrated in FIG. 6 and comprises an inverter circuit for controlling connections between the power supply 92 and the phases P1, P2, P3 of the motor windings for the brushless DC motor 52. The BLDC inverter 86a includes three high side FETs Q1, Q3, Q5 and three low side FETs Q2, Q4, Q6 connected to the winding phases P1, P2, P3 in a conventional configuration to provide synchronous motor control by switching of the FETs, as determined by the system controller 84 providing pulse width modulation (PWM) control signals through inputs PWM1, PWM2, PWM3, PWM4, PWM5, PWM6 to control the motor speed and torque output according to selected duty cycles.

Figure 7:
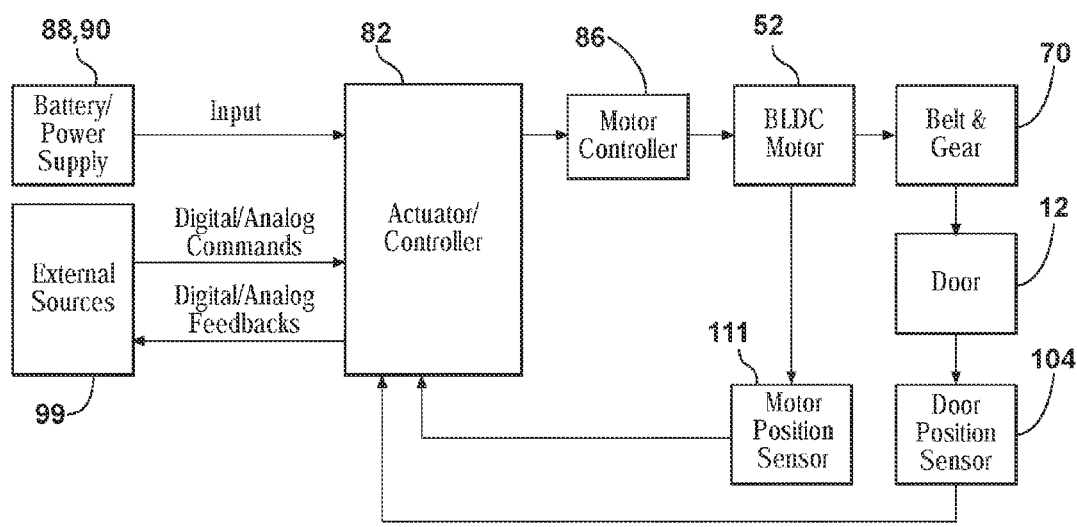
FIG. 7 is a diagrammatic illustration of the relationship between components in the door system controlled by the electric door actuation system.

The motor actuation operations provided via the control signals from the system controller 84 include position command functions for moving or positioning the door 12, which are performed with reference to input signals provided to the system controller 84 from the absolute encoder position sensor 104, from a current sensor 108 (FIG. 6) at the BLDC inverter 86a, and from a motor position sensor 111 (FIG. 7). The motor position sensor 111 comprises one or more Hall sensors, and preferably comprises three Hall sensors providing three Hall sensor signals for six commutation states associated with one electrical cycle during rotation of a rotor for the motor 52. The door position command functions include: A) Close and Hold Closed command function, B) Open and Hold Open command function, C) Open Hold and Close command function, D) Sequence Open Hold and Close command function, and E) Learn Open and Closed Positions command function. The motor actuation operation, and associated position command function, to be executed is determined by one or more digital input signals, such as may be provided by the interface electronics 96 (FIG. 4) associated with the system controller 84 for receiving signals from ancillary devices and/or sensors, 98, 99a, 99b, 101 (FIG. 5), generally indicated at 99 in FIG. 7. For example, the activation of the electric actuator 28 to open and/or close the door 12 may be implemented by a light push on the door 12, and further may comprise pushing on a door opening mechanism, such as a door push bar, by activating a switch or other triggering mechanism, or by a signal provided on the communication conduit 102 from a remote location.

The system controller 84 will control the selection of the position command function in a predetermined order of priority in accordance with a pseudo-code implemented by the system controller 84. If the Learn Open and Closed Positions command is OFF, then the order of priority will be as follows:
  i) If Close and Hold command is ON, then execute Close and Hold position command function;
  ii) Else, if Open and Hold command is ON, then execute Open and Hold position command function;
  iii) Else, if Open Hold and Close command is ON, then execute Open Hold and Close position command function;
  iv) Else, if Sequence Open command is ON, then execute Sequence Open position command function;
    Else—Execute Dynamic Brake command function;
  Else—[Learn Open and Closed Positions]
  i) If Sequence Open command is ON and Open and Hold command is ON, then Learn the door position as OPEN_POSITION;
  ii) Else, if Sequence Open command is ON and Close and Hold command is ON, then Learn the door position as CLOSED_POSITION.

During an initial set up procedure for the door actuator, the Learn Open and Closed Positions command functions are implemented to train the system to define the angular locations of the open and closed positions, as sensed by the door position sensor 104, as will be described in greater detail below. The range of door movement will typically be approximately 90 degrees, where the door closed position may be defined as 180 degrees and the door open position may be defined as 270 degrees. An amount of time required for the door to sweep or move between the open and closed positions, i.e., a set point value, may be manually set by an operator, such as during an initial set up procedure for the particular application of the door actuator. For example, in a typical application, the set point value may correspond to a door sweep time of approximately 5 seconds. The set point value, and other variable settings, may be entered through potentiometer settings, such as by adjustment of the one or more potentiometers 112 at the control unit 82. Alternatively, these variables may be viewed and adjusted through a Graphical User Interface (GUI), such as may be implemented through an external personal computer 110 (see FIG. 5) where the programming may be stored in the non-volatile memory 85 of the system controller 84, thereby retaining the settings even during a system power loss. The sweep time, as defined by the set point value, and the range of door movement may be used to define a speed set value, $\omega_{set}$, that comprises the angular sweep distance traveled by the door 12 per unit time, defining a maximum rate or speed for the movement of the door 12 between the open and closed positions.

Each of the position command functions are used to generate control signals at the system controller 84 to switch the power source connections through inputs PWM1, PWM2, PWM3, PWM4, PWM5, PWM6 to control the motor 52. The pulse width modulation (PWM) signals for the position command functions are produced in accordance with duty cycles determined with reference to speed command values, $\omega_{cmd}$, and current commands, $I_{cmd}$, associated with position commands. The position command functions are described as follows, and with further reference to the Position Command table of FIG. 8:

A) Close and Hold Command Function

Figure 10:
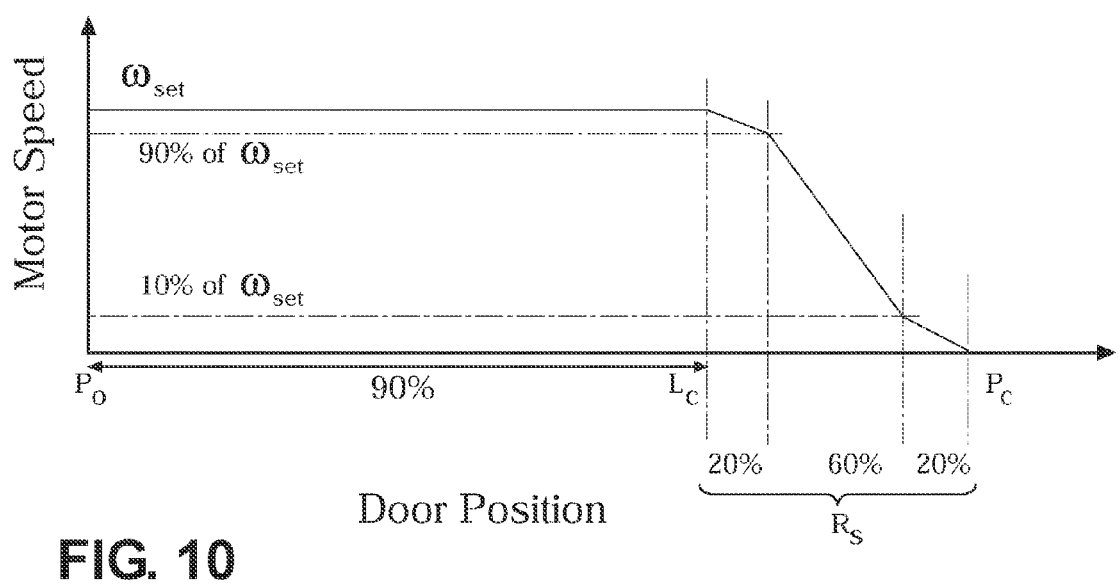
FIG. 10 is a graphical representation of the command function for closing the door.

When the system controller 84 receives a signal, such as may be provided from the communication conduit 102, or from ancillary devices and/or sensors 99, the Close and Hold closed position command function is performed as follows (see FIG. 10):
  i) A movement of the door from the open position, $P_O$, toward the closed position, $P_C$, may be initiated. During movement of the door between the open position, $P_O$, and a lock check position, $L_C$, the speed command value, $\omega_{cmd}$, is set to the speed set value, $\omega_{set}$; and the current command, $I_{cmd}$, is set to a maximum value, $-I_{max}$, such that a maximum available current may flow. The lock check position, $L_C$, may be defined as a location that is 90% of the total door movement from the open position, $P_O$, toward the closed position, $P_C$;
  ii) During movement of the door through a soft stop range, $R_S$, defined between the lock check position, $L_C$, and the closed position, $P_C$, the speed command value, $\omega_{cmd}$, is initially reduced generally linearly from $\omega_{set}$ to $0.9*\omega_{set}$ as the door travels through 20% of the soft stop range, $R_S$, from the lock check position, L. That is, for operation in the soft stop range, $R_S$, the speed command, $\omega_{cmd}$, is reduced linearly with reference to the actual angular position, $\theta_{act}$, of the door 12. In addition, the current command, $I_{cmd}$, is maintained at $-I_{max}$. The soft stop range, $R_S$, may typically comprise approximately the last 10% of door movement to the closed position;
  iii) During movement of the door through the soft stop range, $R_S$, between a location 20% from the lock check position, $L_C$, and 80% from the lock check position, $L_C$, the speed command value, $\omega_{cmd}$, is reduced generally linearly from $0.9*\omega_{set}$ to $0.1*\omega_{set}$, and the current command, $I_{cmd}$, is maintained at $-I_{max}$;
  iv) During movement of the door through the soft stop range, $R_S$, between the location 80% from the lock check position, $L_C$, and a location defined as the closed position plus X1 degree, the speed command value, $\omega_{cmd}$, is reduced generally linearly from $0.1*\omega_{set}$ to 0, and the current command, $I_{cmd}$, is maintained at $-I_{max}$. In an exemplary application, X1 may be set equal to 1 degree, such that the closed position (180 degrees) plus X1 may be equal to 181 degrees;
  v) During movement of the door within 1 degree of the closed position, $P_C$, the speed command value, $\omega_{cmd}$, is set to 0, and the current command, $I_{cmd}$, is set to −0.1 A for 200 ms.

Subsequently, a Holding command function is applied, as is described below, to apply a dynamic braking force to the door by shorting the motor phase terminals using the inverter switches. Further, if the door passes the closed position, $P_C$, such that the door position is less than the closed position minus X1 degree (e.g., 1 degree), then a speed command value, $\omega_{cmd}$, of $0.2*\omega_{set}$ is applied with a current command of $I_{max}$, to move the door in the direction of the closed position, $P_C$.

B) Open and Hold Command Function

Figure 9:
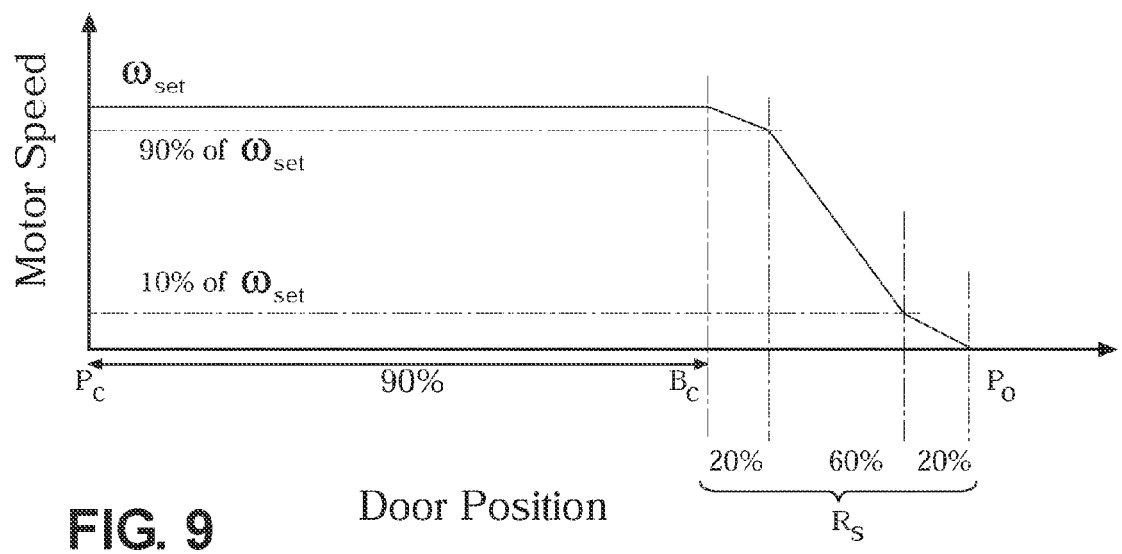
FIG. 9 is a graphical representation of the command function for opening the door.

When the system controller 84 receives a signal, such as may be provided from the communication conduit 102, or from ancillary devices and/or sensors 99, the Open and Hold closed position command function is performed as follows (see FIG. 9):

i) A movement of the door from the closed position, $P_C$, toward the open position, $P_O$, may be initiated. During movement of the door between the closed position, $P_C$, and a back check position, $B_C$, the speed command value, $\omega_{cmd}$, is set to the speed set value, $\omega_{set}$; and the current command, $I_{cmd}$, is set to a maximum value, $I_{max}$, such that a maximum available current may flow. The back check position, $B_C$, may be defined as a location that is 90% of the total door movement from the closed position, $P_C$, toward the open position, $P_O$;

ii) During movement of the door through a soft stop range, $R_S$, defined between the back check position, $B_C$, and the open position, $P_O$, the speed command value, $\omega_{cmd}$, is initially reduced generally linearly from $\omega_{set}$ to $0.9*\omega_{set}$ as the door travels through 20% of the soft stop range, $R_S$, from the back check position, B. That is, for operation in the soft stop range, $R_S$, the speed command, $\omega_{cmd}$, is reduced linearly with reference to the actual angular position, $\theta_{act}$, of the door 12. In addition, the current command, $I_{cmd}$, is maintained at $I_{max}$. The soft stop range, $R_S$, may typically comprise approximately the last 10% of door movement to the open position;

iii) During movement of the door through the soft stop range, $R_S$, between a location 20% from the back check position, $B_C$, and 80% from the back check position, $B_C$, the speed command value, $\omega_{cmd}$, is reduced generally linearly from $0.9*\omega_{set}$ to $0.1*\omega_{set}$, and the current command, $I_{cmd}$, is maintained at $I_{max}$;

iv) During movement of the door through the soft stop range, $R_S$, between the location 80% from the back check position, $B_C$, and a location defined as the open position minus X1 degree, the speed command value, $\omega_{cmd}$, is reduced generally linearly from $0.1*\omega_{set}$ to 0, and the current command, $I_{cmd}$, is maintained at $I_{max}$. In an exemplary application, X1 may be set equal to 1 degree, such that the open position (270 degrees) minus X1 may be equal to 269 degrees;

v) During movement of the door within 1 degree of the open position, $P_O$, the speed command value, $\omega_{cmd}$, is set to 0, and the current command, $I_{cmd}$, is set to 0.1 A for 200 ms.

Subsequently, a Holding command function is applied, as is described below, to apply a dynamic braking force to the door. Further, if the door passes the open position, $P_O$, such that the door position is greater than the open position plus X1 degree (e.g., 1 degree), then a speed command value, $\omega_{cmd}$, of $0.2*\omega_{set}$ is applied with a current command of $-I_{max}$, to move the door in the direction of the open position, $P_O$.

C) Open Hold and Close Command Function

When the system controller 84 receives a signal, such as may be provided from the communication conduit 102, or from ancillary devices and/or sensors 99, the Open Hold and Close position command function is performed as follows:

i) The Open and Hold command function is applied as described above under section B);

ii) During holding at the open position, the door is held for X3 seconds, where X3 may be a calibrated analog input for the hold open time, and where X3 may be in the range of from about 0 to about 10 seconds;

iii) After X3 seconds have elapsed, the Close and Hold command function is applied as described above under section A).

D) Sequence Open Hold and Close Command Function

When the system controller 84 receives a signal, such as may be provided from the communication conduit 102, or from ancillary devices and/or sensors 99, the Sequence Open position command function is performed as follows:

i) The Open Hold and Close command function is applied as described above under Section C) after applying an initial delay of T1 seconds. A nominal value of T1 may be set to approximately 4 seconds.

E) Learn Open and Closed Positions

The door open and closed positions are determined and permanently saved through a manual movement of the door and actuation of the system controller 84, as follows:

i) The Learn Open and Closed Positions is turned ON ii) The door is manually positioned in the closed position and then the Sequence Open command function and the Close and Hold command function are activated;

iii) The system controller 84 will read the actual position value from the position sensor 104 and will store the value in the non-volatile memory 85, i.e., an EEPROM, as a value corresponding to the Closed_Position;

iv) The Close and Hold command function is turned off;

v) The door is manually positioned to the open position and then the Sequence Open command function and the Open and Hold command function are activated;

vi) The system controller 84 will read the actual position value from the position sensor 104 and will store the value in the non-volatile memory 85 as a value corresponding to the Open_Position;

vii) The Open and Hold command and the Sequence Open Hold and Close command are turned off;

viii) The Learn Open and Closed Positions command is turned OFF.

The following additional door position control functions may also be provided:

F) Dynamic Brake Command Function (Hold command)

The dynamic braking command function or Hold command (FIG. 8) comprises a non-powered motor actuation operation in which the three low-side FETs Q2, Q4 and Q6 of the BLDC inverter 86a are turned on, i.e., to short the motor phase terminals, in response to predetermined conditions, such as when the door 12 is in either the open or the closed position. When the door is in the open or the closed position, the dynamic brake is turned on with 80% duty cycle without a speed or current command, such that no motive electrical power is provided to the motor 52 for powering the motor in rotation. This activation works against wind or other noisy inputs, where movement of the door 12 operates to produce a movement of the rotor in the motor 52 resulting in a back-emf (electromotive force) in the motor phases P1, P2, P3, producing a circulating current in the motor windings which generates a torque against the direction of door movement. The dynamic brake may hold the door within a predetermined range, such as within 1 degree, to either side of its position, i.e., in either the open or closed position, see FIG. 8. The 80% duty cycle permits the door to be pushed open without an unusual braking force being felt by a person exerting the opening force, and the duty cycle may be adjusted so that the door may be moved in response to a predetermined force. For example, in the present application, the duty cycle may be set to permit movement of the door when a force of 15 pounds or greater is applied to the door. The dynamic brake is deactivated upon detection of a predetermined initial angular position change within a preset time, as described below with regard to push or pull activation, indicating a manual movement of the door as distinguished from a noisy input. Similarly, the dynamic brake is also deactivated upon detection of a signal to open the door 12, such as is provided from the ancillary devices and/or sensors 99, providing input signals to the system controller 84 via the interface electronics 96.

G) Push or Pull to Close Function i) While performing the Hold command function in the open position, if the door changes position by X2 degrees towards the closed position, the Close and Hold position command will be activated. For example, X2 may be a calibrated analog input to set the sensitivity, and may be set, for example, to a value of approximately 2 to 8 degrees.

ii) While performing the Hold command function in the closed position, if the door changes position by X2 degrees towards the open position, the Open and Hold position command will be activated. For example, X2 may be a calibrated analog input to set the sensitivity, and may be set, for example, to a value of approximately 2 to 8 degrees.

H) Obstacle Detection and Reaction Function

Detection: Any of the following conditions will start an obstacle detection counter:

i) During opening, the door has moved to a location that is greater than 3 degrees from the closed position, and a measured current on the motor is $I_{max}$;

ii) During closing, the door has moved to a location that is greater than 3 degrees from the open position, and a measured current on the motor is $I_{max}$; or iii) When either of the door opening command or the door closing command is active, detecting that the door position has not changed at least 1 degree in 200 ms.

If any of the above conditions are met, the obstacle detection counter is increased by one count, and the active opening or closing command is executed. If the obstacle detection counter counts up to three, i.e., a detection condition is met three times during execution of the door opening or closing command, then the obstacle detection criteria is met. Note that the counter is reset to zero when the door reaches either the OPEN_POSITION or the CLOSED_POSITION.

Reaction: Upon meeting the obstacle detection criteria, the system controller 84 will change the direction of door movement and move the door to a hard stop, i.e., either the OPEN_POSITION or the CLOSED_POSITION. After reaching a hard stop, the system controller 84 will wait for 2 seconds and execute the original commanded function.

In accordance with an aspect of the invention, the speed set value, $\omega_{set}$, is utilized by the system controller 84 to provide an input to the motor controller 86 for producing control signals corresponding to the particular configuration of the door operator. That is, the control signals for controlling operation of the motor 52 are provided in accordance with the operator selected sweep time and the angular sweep distance for the door 12 in a particular application, where different installation locations may result in different sweep distances between the open and closed positions, and the available voltage for powering the motor 52, i.e., the bus voltage, $V_{Bus}$, may vary from location to location. Hence, the present system controller 84 is configured to adapt the motor control signals to the particular installation conditions for a given location.

Figure 11:
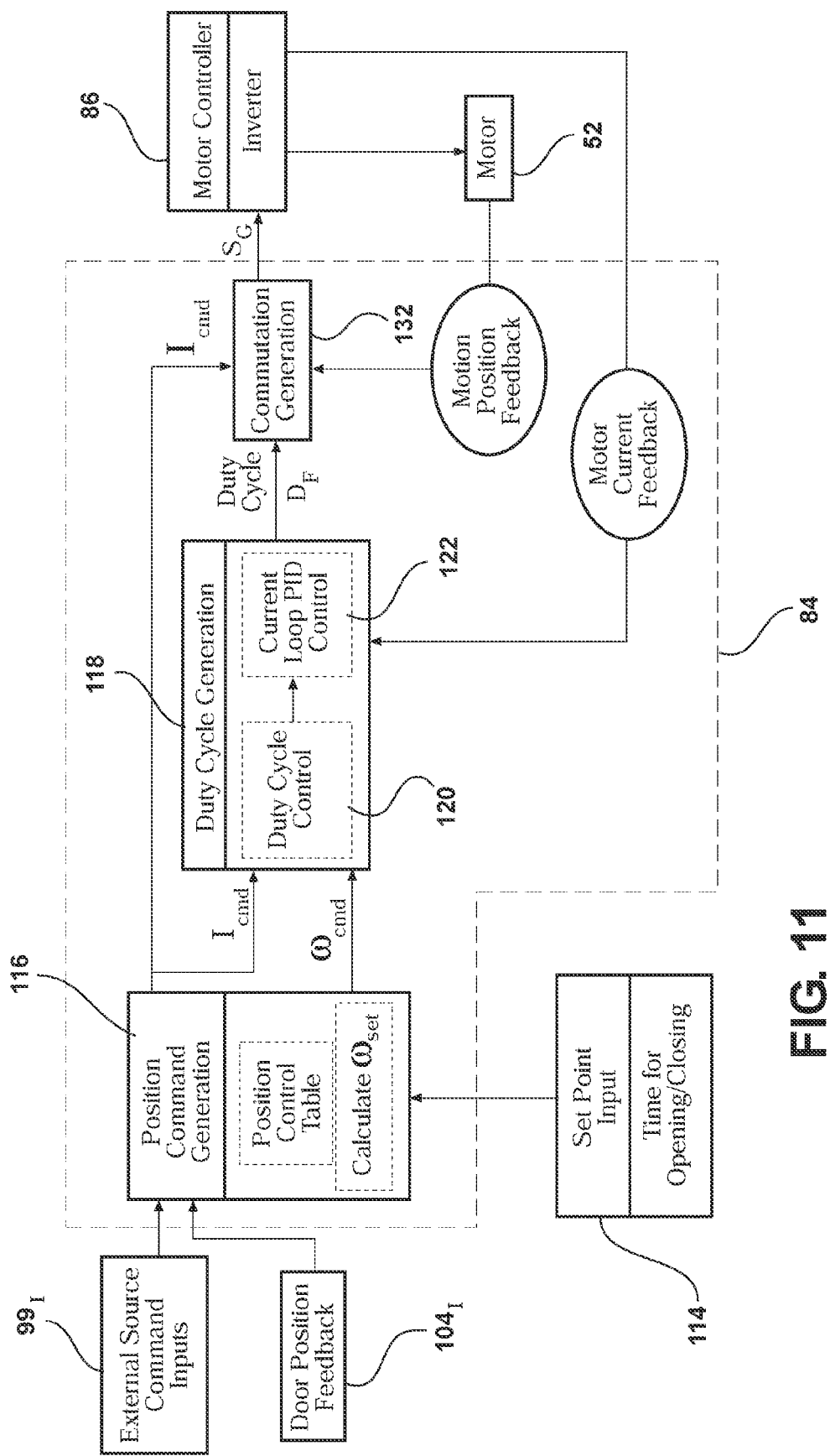
FIG. 11 is a diagrammatic illustration of functional components and/or operations for providing control signals to the motor.

Referring to FIG. 11, the system controller 84 is illustrated diagrammatically comprising functionally depicted components and/or operations for providing the control signals to the motor 52. The system controller 84 may receive external source command inputs 99, from the external sources 99 (FIG. 7), door position feedback 104, from the position sensor 104 (FIG. 7), and a set point input 114 corresponding to an operator specified time for opening and closing the door 12, which may be input through the one or more potentiometers 112 or through a GUI.

The system controller 84 performs a position command generation operation 116 which includes using one or more of the external source command inputs $99_I$ and the door position feedback $104_I$ to select a command function, e.g., a command function from the Position Command table of FIG. 8. In addition, a speed set value, $\omega_{set}$, is determined from the set point input 114 for use in the table of FIG. 8, and for use in providing a speed command value, $\omega_{cmd}$, as described previously. The position command generation operation 116 provides an output of a speed command value, $\omega_{cmd}$, and a current command, $I_{cmd}$, to a duty cycle generation operation 118, which comprises a duty cycle control 120 and a current loop PID control 122.

Figure 12:
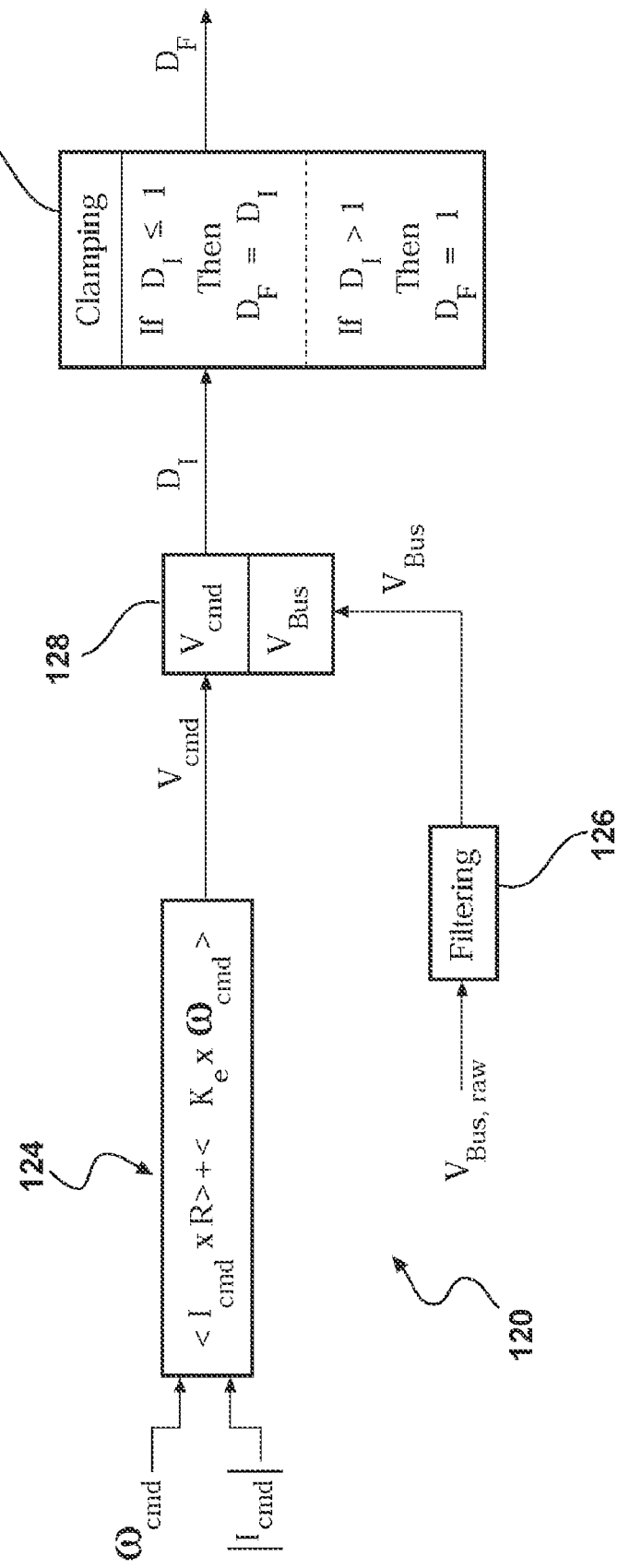
FIG. 12 is a diagrammatic illustration of a duty cycle control for the system controller.

Referring to FIG. 12, the duty cycle control 120 uses the speed command value, $\omega_{cmd}$, and the current command, $I_{cmd}$, to determine a duty cycle voltage command value, $V_{cmd}$. It may be noted that the current command, $I_{cmd}$, used in the duty cycle control 120 comprises an absolute value of the current command, $I_{cmd}$. The duty cycle voltage command value, $V_{cmd}$, is determined at 124 in accordance with the equation:

$$V_{cmd} = (I_{cmd} * R) + (K_e * \omega cmd)$$

where:
$I_{cmd}$=a current command value (absolute value) corresponding to a motor actuation operation selected from the plurality of predetermined motor actuation operations (table of FIG. 8);
R=a line-to-line resistance (constant) of the motor 52;
$K_e$=a back emf constant of the motor 52; and
$\omega_{cmd}$=the speed command value corresponding to the selected motor actuation operation (table of FIG. 8).

The voltage provided from either the building power source 88 or the battery back-up 90, indicated as a raw bus voltage, $V_{Bus, raw}$, may comprise noise components, and this voltage is passed through a filtering component 126 to provide a voltage substantially without the noise components, and is indicated as a bus voltage $V_{Bus}$. An initial or first duty cycle value, $D_I$, is calculated at 128 as a ratio of the duty cycle voltage command value, $V_{cmd}$, and the bus voltage, $V_{Bus}$. A clamping operation 130 is applied to the first duty cycle value, $D_I$, to prevent the duty cycle used to control the motor 52 from exceeding a value of one (100% duty cycle). In particular, a final duty cycle value, $D_F$, is set equal to one (100% duty cycle) if the first duty cycle value, $D_I$, is greater than one, and the final duty cycle value, $D_F$, is set equal to the first duty cycle value, $D_I$, if the first duty cycle value, $D_I$, is less than or equal to one.

It should be noted that the duty cycle calculation at 126 scales the duty cycle command value, $V_{cmd}$, relative to the voltage available as the bus voltage, $V_{Bus}$. Thus, if the available bus voltage, $V_{Bus}$, is greater than the duty cycle voltage command value, $V_{cmd}$, the bus voltage, $V_{Bus}$, is adjusted to provide the voltage specified by the duty cycle command value, $V_{cmd}$. For example, if the duty cycle command value, $V_{cmd}$, is 12V and the bus voltage, $V_{Bus}$, is 24V, then the duty cycle applied by the PWM control signal will equal 50% to provide a 12V drive signal from the 24V source. Similarly, if a lower value of bus voltage, $V_{Bus}$, is available, such as a voltage of 20V, then the duty cycle to provide a 12V drive signal will be 12V/20V=60%. Hence, the desired door opening speed may be provided by the present system controller 84 regardless of the available supply voltage.

The final duty cycle, $D_F$, provided to the motor 52 is further controlled by the current loop PID control 122. The current loop PID control 122 uses a motor current feedback, such as may be provided by sensor 108 (FIG. 6) to adjust the PWM duty cycle in a conventional manner to control the speed of the motor 52.

The final duty cycle, $D_F$, is provided to a commutation generation operation 132 (FIG. 11). The commutation generation operation 132 further receives the current command, $I_{cmd}$, and motor position feedback from the motor position sensor 111 (FIG. 7) and comprises a commutation controller to generate PWM gate or control signals, $S_G$. The control signals, $S_G$, are provided to the inputs PWM1, PWM2, PWM3, PWM4, PWM5, PWM6 of the BLDC inverter 86*a* to control the motor 52 (FIG. 6) to a speed corresponding to the speed command value, $\omega_{cmd}$.

It should be understood that incorporating a brushless DC motor 52 and the associated motor controller 86 in the present electric actuator 28 provides advantages over the brush or commutator type motors typically used in prior art door actuation systems. For example, the brushless DC motor 52 provides higher motor acceleration rates enabling greater accuracy and control over door movements in that the brushless DC motor 52, which for the present application has field magnets on the inner rotating member, has a higher torque-to-inertia ratio than that provided by a comparable conventional commutator type motor. In addition, the brushless DC motor 52 has the further attributes of lower electromagnetic interference (EMI), lower audible operating noise, higher operating efficiencies, greater speed capabilities and greater thermal efficiencies, i.e., lower temperature rise per watt ($T_\ominus$).

A further advantage of using a 24 VDC motor is that the electric actuator 28 is not subject to limitations imposed by safety codes, such as codes restricting placement of 110 V power on doors, which may limit or prevent installation of a 110 V motor on the door 12. Further, UL certification is not required for an installation incorporating the low voltage electric actuator 28. Accordingly, fewer restrictions are imposed on the installation in that the electric actuator 28 may be installed by persons other than licensed technicians, thereby potentially decreasing the installation costs. In addition, as a result of the low voltage used for the motor 52, it is not necessary to run conduit for the power lines such as the power lines for the building power system 88 and the battery system 90.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlling an electric motor of an automatic door system, the motor comprising a brushless DC motor being operatively connected to a door panel to enable the motor to perform a door moving operation for moving the door relative to a door frame, the motor being operable to move the door between open and closed positions using electric power signals delivered to the motor from an electric power supply, the electric power signals being controlled through a motor controller in communication with a system controller, and the system controller being operable to provide control signals to the motor controller for switching power source connections from the power supply to windings of the motor to define motor actuation operations, the method comprising:
   at the system controller selecting a motor actuation operation from a plurality of predetermined motor actuation operations, and providing control signals to the motor controller corresponding to the selected motor actuation operation, wherein the motor controller comprises an inverter circuit controlling the power source connections to the windings of the brushless DC motor;
   effecting control of movement of the door using the selected motor actuation operation whereby the angular position of the door relative to the door frame is controlled by switching the power source connections in response to the control signals received from the system controller; and
   wherein the motor actuation operation comprises switching the power source connections in the inverter circuit to short together a plurality of the motor windings to produce a braking torque in the motor in accordance with a pulse width modulation control to maintain the door at a substantially stationary position relative to the door frame including providing a resistance to an external force applied on the door in a door opening direction wherein the pulse width modulation control is performed at a selected duty cycle without providing a motive electrical power to the motor.

2. The method as in claim 1, including a further motor actuation operation initiated by an external force applied against the door in one of the door opening and closing directions, where the system controller determines that a predetermined sensed actual angular movement of the door in the one of the door opening and closing directions within a predetermined time period exceeds a predetermined angular rate and the system controller selects a motor actuation operation causing the motor controller to provide control signals to the motor controller to switch the power source connections and thereby provide an electrical power signal to the motor for effecting a powered door operation in the one of the door opening and closing directions.

3. The method as in claim 1, including providing a set point input, the set point input defined as an operator selected parameter provided as an input to the system controller and corresponding to at least one of a door opening time and a door closing time;
   converting the set point input to a speed set value comprising a maximum speed for the motor to move the door; and
   providing a speed command value proportional to the speed set value, and using the speed command value to provide a duty cycle voltage command value for generating control signals to provide power to the motor.

4. The method as in claim 3, including providing a first duty cycle value equal to a ratio of the duty cycle voltage command value and a bus voltage value, the bus voltage value corresponding to a voltage provided from the power supply; and
   providing control signals from the system controller to the motor controller corresponding to the first duty cycle value, the control signals determined with reference to the first duty cycle value, and switching the power source connections in response to the control signals received from the system controller to effect movement of the door at a speed corresponding to the speed command value.

5. The method as in claim 1, wherein switching the power source connections in the inverter circuit comprises switching the power source connections at a duty cycle of approximately 80% to maintain the door at a substantially stationary closed position with a predetermined resistance to an external door opening force.

6. The method as in claim 1, wherein sensed actual angular positions of the door are controlled with reference to corresponding position commands for the door, where the actual angular positions of the door are positions of the door relative to the door frame, as sensed by a position sensor and transmitted as a door position signal to the system controller, and the position commands of the door comprise calculated angular positions for the door relative to the door frame determined at the system controller with reference to a selected motor actuation operation.

7. The method as in claim 1, including a user selectable command for interacting with operating instructions stored in a memory of the system controller to learn open and closed positions of the door, applying an external force to the door to move the door to open and closed positions, sensing the actual angular positions of the door relative to the door frame at a position sensor, transmitting open and closed actual angular positions as door position signals from the door position sensor to the system controller, and storing the open and closed angular positions in a non-volatile memory in the system controller for effecting retention of the door open and closed actual angular positions during a power loss condition to the system controller and for use in generating control signals during motor actuation operations.

8. A method for controlling an electric motor of an automatic door system, the motor being operatively connected to a door panel to enable the motor to perform a door moving operation for moving the door relative to a door frame, the motor being operable to move the door between open and closed positions using electric power signals delivered to the motor from an electric power supply, the electric power signals being controlled through a motor controller in communication with a system controller, and the system controller being operable to provide control signals to the motor controller for switching power source connections from the power supply to windings of the motor to define motor actuation operations, the method comprising:

providing a set point input, the set point input defined as an operator selected parameter provided as an input to the system controller and corresponding to at least one of a door opening time and a door closing time;

converting the set point input to a speed set value comprising a maximum speed for the motor to move the door;

providing a speed command value proportional to the speed set value, and using the speed command value to provide a variable voltage command value;

providing a first duty cycle value equal to a ratio of the variable voltage command value and a bus voltage value, the bus voltage value corresponding to a voltage provided from the power supply; and providing control signals from the system controller to the motor controller corresponding to the first duty cycle value, the control signals determined with reference to the first duty cycle value, and switching the power source connections in response to the control signals received from the system controller to effect movement of the door at a speed corresponding to the speed command value.

9. The method of claim 8, wherein the converting the set point input to a speed set value comprises inputting to the system controller an angular sweep of the door between a door closed position and a door open position and the speed set value comprises a rate of door movement proportional to the angular sweep of the door in a time period corresponding to the set point input.

10. The method of claim 8, wherein the duty cycle voltage command value, $V_{cmd}$, is determined in accordance with the equation:

$$V_{cmd}=(I_{cmd}*R)+(K_e*\omega_{cmd})$$

where:
$I_{cmd}$=a current command value corresponding to a motor actuation operation selected from a plurality of predetermined motor actuation operations;
R=a line-to-line resistance of the motor;
$K_e$=a back emf constant of the motor; and
$\omega_{cmd}$=a speed command value corresponding to the selected motor actuation operation.

11. The method of claim 8, including providing a final duty cycle value with reference to the first duty cycle value for determining the control signals, the final duty cycle value being set equal to one if the first duty cycle value is greater than one, and the final duty cycle value equaling the first duty cycle value if the first duty cycle value is less than or equal to one.

12. The method of claim 8, wherein, during at least one of opening and closing of the door, the system controller effects movement of the door at a maximum speed corresponding to the speed command value equaling the speed set value throughout a first range of travel comprising approximately 90% percent of the door movement.

13. The method of claim 12, wherein the speed command value is decreased from the speed set value at a generally linear rate of deceleration during a second range of door movement.

14. The method as in claim 8, wherein the motor comprises a brushless DC motor and the motor controller comprises inverter circuit controlling the power source connections to the windings of the brushless DC motor.

15. A method for controlling an electric motor of an automatic door system, the motor being operatively connected to a door panel to enable the motor to perform a door moving operation for moving the door relative to a door frame, the motor being operable to move the door between open and closed positions using electric power signals delivered to the motor from an electric power supply, the electric power signals being controlled through a motor controller in communication with a system controller, and the system controller being operable to provide control signals to the motor controller for switching power source connections from the power supply to windings of the motor to define motor actuation operations, the method comprising:

at the system controller selecting a motor actuation operation from a plurality of predetermined motor actuation operations, and providing control signals to the motor controller corresponding to the selected motor actuation operation;

effecting control of movement of the door using the selected motor actuation operation whereby the angular position of the door relative to the door frame is controlled by switching the power source connections in response to the control signals received from the system controller; and including a motor actuation operation initiated by an external force applied against the door in one of the door opening and closing directions, where the system controller determines that a predetermined sensed actual angular movement of the door in the one of the door opening and closing directions within a predetermined time period exceeds a predetermined angular rate and the system controller selects a motor actuation operation causing the motor controller to provide control signals to the motor controller to switch the power source connections and thereby provide an electrical power signal to the motor for effecting a powered door operation in the one of the door opening and closing directions.

16. A method for controlling an electric motor of an automatic door system, the motor comprising a brushless DC motor being operatively connected to a door panel to enable the motor to perform a door moving operation for moving the door relative to a door frame, the motor being operable to move the door between open and closed positions using electric power signals delivered to the motor from an electric power supply, the electric power signals being controlled through a motor controller in communication with a system controller, and the system controller being operable to provide control signals to the motor controller for switching power source connections from the power supply to windings of the motor to define motor actuation operations, the method comprising:

at the system controller selecting a motor actuation operation from a plurality of predetermined motor actuation operations, and providing control signals to the motor controller corresponding to the selected motor actuation operation, wherein the motor controller comprises an inverter circuit controlling the power source connections to the windings of the brushless DC motor;

effecting control of movement of the door using the selected motor actuation operation whereby the angular position of the door relative to the door frame is controlled by switching the power source connections in response to the control signals received from the system controller; and further including:

providing a set point input, the set point input defined as an operator selected parameter provided as an input to the system controller and corresponding to at least one of a door opening time and a door closing time;

converting the set point input to a speed set value comprising a maximum speed for the motor to move the door; and providing a speed command value proportional to the speed set value, and using the speed command value to provide a duty cycle voltage command value for generating control signals to provide power to the motor.

17. A method for controlling an electric motor of an automatic door system, the motor being operatively connected to a door panel to enable the motor to perform a door moving operation for moving the door relative to a door frame, the motor being operable to move the door between open and closed positions using electric power signals delivered to the motor from an electric power supply, the electric power signals being controlled through a motor controller in communication with a system controller, and the system controller being operable to provide control signals to the motor controller for switching power source connections from the power supply to windings of the motor to define motor actuation operations, the method comprising:

at the system controller selecting a motor actuation operation from a plurality of predetermined motor actuation operations, and providing control signals to the motor controller corresponding to the selected motor actuation operation;

effecting control of movement of the door using the selected motor actuation operation whereby the angular position of the door relative to the door frame is controlled by switching the power source connections in response to the control signals received from the system controller; and wherein sensed actual angular positions of the door are controlled with reference to corresponding position commands for the door, where the actual angular positions of the door are positions of the door relative to the door frame, as sensed by a position sensor and transmitted as a door position signal to the system controller, and the position commands of the door comprise calculated angular positions for the door relative to the door frame determined at the system controller with reference to a selected motor actuation operation.

18. A method for controlling an electric motor of an automatic door system, the motor being operatively connected to a door panel to enable the motor to perform a door moving operation for moving the door relative to a door frame, the motor being operable to move the door between open and closed positions using electric power signals delivered to the motor from an electric power supply, the electric power signals being controlled through a motor controller in communication with a system controller, and the system controller being operable to provide control signals to the motor controller for switching power source connections from the power supply to windings of the motor to define motor actuation operations, the method comprising:

at the system controller selecting a motor actuation operation from a plurality of predetermined motor actuation operations, and providing control signals to the motor controller corresponding to the selected motor actuation operation;

effecting control of movement of the door using the selected motor actuation operation whereby the angular position of the door relative to the door frame is controlled by switching the power source connections in response to the control signals received from the system controller; and including a user selectable command for interacting with operating instructions stored in a memory of the system controller to learn open and closed positions of the door, applying an external force to the door to move the door to open and closed positions, sensing the actual angular positions of the door relative to the door frame at a position sensor, transmitting open and closed actual angular positions as door position signals from the door position sensor to the system controller, and storing the open and closed angular positions in a non-volatile memory in the system controller for effecting retention of the door open and closed actual angular positions during a power loss condition to the system controller and for use in generating control signals during motor actuation operations.

19. The method as in claim 1, wherein the step of switching the power source connections in accordance with a pulse width modulation control at a selected duty cycle maintains the door at a substantially stationary closed position with a predetermined resistance to an external door opening force.

* * * * *

UNITED STATES PATENT AND TRADEMARK OFFICE
CERTIFICATE OF CORRECTION

PATENT NO. : 8,405,337 B2
APPLICATION NO. : 12/616334
DATED : March 26, 2013
INVENTOR(S) : Steven A. Gebhart et al.

It is certified that error appears in the above-identified patent and that said Letters Patent is hereby corrected as shown below:

In the Specification

Col. 8, line 42, "lock check position, L" should read -- lock check position $L_c$ --;

Col. 9, line 29, "check position B" should read -- check position $B_c$ --;

Col. 12, line 29, " $V_{cmd} = (I_{cmd} * R) + (K_e * \omega_{cmd})$ " should read -- $V_{cmd} = (I_{cmd} * R) + (K_e * \omega_{cmd})$" --.

Signed and Sealed this
Twenty-fourth Day of September, 2013

Teresa Stanek Rea
*Deputy Director of the United States Patent and Trademark Office*